(12) United States Patent
Wang et al.

(10) Patent No.: US 9,337,883 B1
(45) Date of Patent: May 10, 2016

(54) PROTECTION CASE FOR MOBILE COMMUNICATION DEVICE

(71) Applicants: Hongxing Wang, Shenzhen (CN); Rongguan Zhou, Shenzhen (CN)

(72) Inventors: Hongxing Wang, Shenzhen (CN); Rongguan Zhou, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/599,707

(22) Filed: Jan. 19, 2015

(30) Foreign Application Priority Data

Nov. 26, 2014 (CN) ...................... 2014 2 0723761 U

(51) Int. Cl.
*H04M 1/00* (2006.01)
*H04B 1/38* (2015.01)
*H04B 1/3888* (2015.01)
*H03F 3/183* (2006.01)

(52) U.S. Cl.
CPC .............. *H04B 1/3888* (2013.01); *H03F 3/183* (2013.01); *H03F 2200/03* (2013.01)

(58) Field of Classification Search
None
See application file for complete search history.

(56) References Cited

U.S. PATENT DOCUMENTS

2009/0003630 A1* 1/2009 Kuroda .................... H04M 1/03 381/150
2009/0156266 A1* 6/2009 Linjama .............. H04M 1/6016 455/567

\* cited by examiner

*Primary Examiner* — Erika A Washington
(74) *Attorney, Agent, or Firm* — IPro, PLLC; Na Xu

(57) ABSTRACT

A protection case for a mobile communication device includes a main body for receiving the mobile communication device, a main circuit board with an amplifier installed thereon, and a vibrator electrically connected to the amplifier. The amplifier comprises audio signal input terminals for receiving audio signals from the mobile communication device, and audio signal output terminals for outputting the audio signals which are amplified by the amplifier to the vibrator; the vibrator is driven to vibrate in accordance with the audio signals output by the amplifier.

19 Claims, 4 Drawing Sheets

PROTECTION CASE FOR MOBILE COMMUNICATION DEVICE

FIELD OF THE DISCLOSURE

The present disclosure generally relates to vibrating acoustic technologies, and more particularly, to a protection case for a mobile communication device, which is capable of generating audible sound through vibration.

BACKGROUND

With development of mobile internet technologies, mobile communication devices, such as smart phones and tablet personal computers, are used widely. A typical mobile communication device employs a vibrating acoustic device for generating audible sound through vibration. The vibrating acoustic device normally uses a vibrator to actuate a display panel or a rear cover of the mobile communication device to vibrate and further generate audible sound. Accordingly, the vibrator and an amplifier for amplifying the audible sound are necessary to the mobile communication device. However, the vibrator and the amplifier need to occupy a relative large space inside the mobile communication device. This is adverse to the miniaturization of the mobile communication device, and moreover, the vibrator and the amplifier may also increase a manufacture cost of the mobile communication device.

Therefore, it is desired to provide an apparatus to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
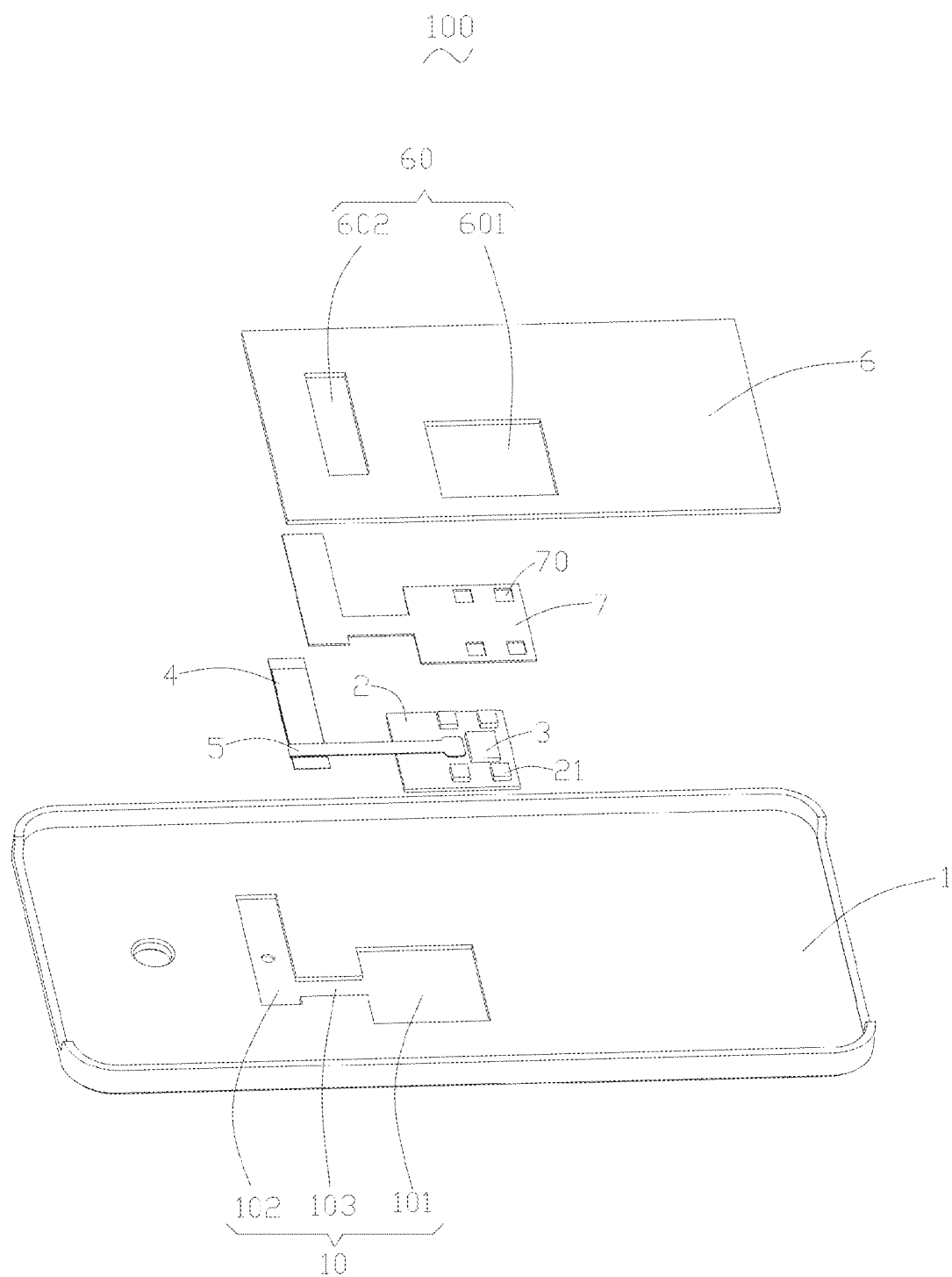
FIG. 1 is an exploded view of a protection case for a mobile communication device according to an exemplary embodiment of the present disclosure.
Figure 2:
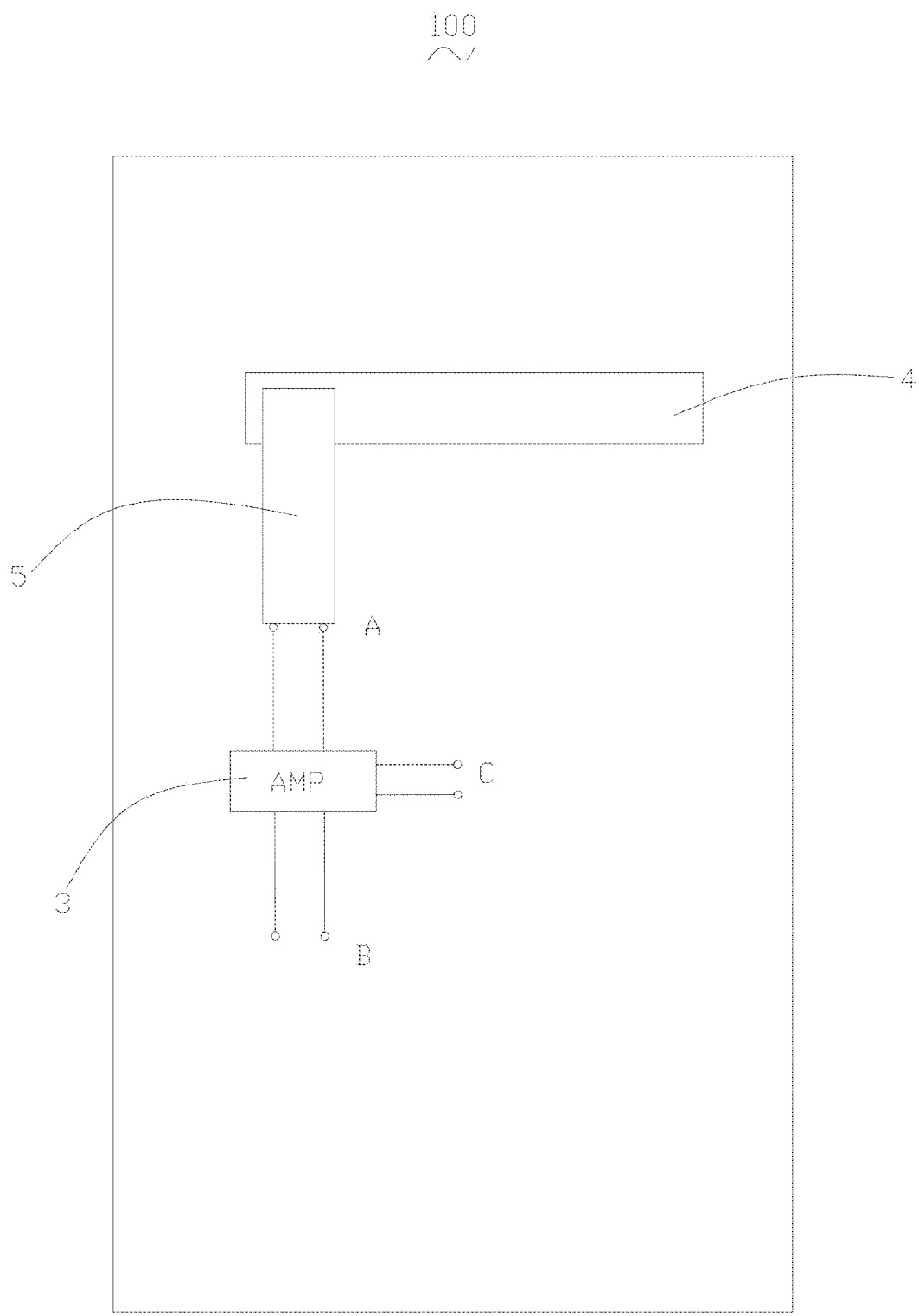
FIG. 2 schematically illustrates connection of a main circuit board, an FPC and a vibrator of the protection case in FIG. 1.
Figure 3:
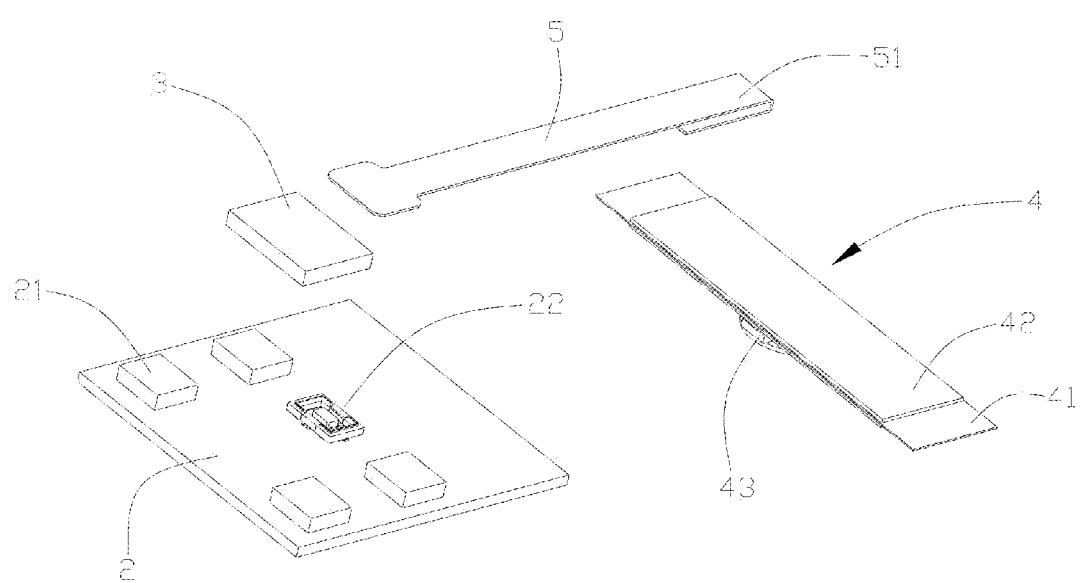
FIG. 3 is an exploded view of the main circuit board, the FPC and the vibrator of the protection case in FIG. 1.

Referring to FIGS. 1-3, a protection case for a mobile communication device according to an exemplary embodiment of the present disclosure is shown. The mobile communication device may for example be a smart phone, a tablet personal computer, or other portal electronic devices; the protection case is configured for protecting the mobile communication device. In the illustrated embodiment, the protection case 100 includes a main body 1, a main circuit board 2, an amplifier 3, a vibrator 4 and a flexible printed circuit board (FPC) 5. The amplifier 3 is fixed on the main circuit board 2, and the vibrator 4 is connected to the main circuit board 2 through the FPC 5; the vibrator 4, the FPC 5 and the main circuit board 2 (with the amplifier 3 thereon) cooperatively form a vibrating acoustic driving module for driving the main body 1 or other vibrating medium to vibrate and produce audible sound.

The main body 1 includes a bottom plate and a plurality of sidewalls; the sidewalls extend perpendicularly from the bottom plate, and cooperate with the bottom plate to form an accommodating space, which is used for receiving the mobile communication device. In practice, the main body 1 may be designed in accordance with the mobile communication device, such that the mobile communication device can be received in the accommodating space. For example, if a rear cover of the mobile communication device is a flat cover, the bottom plate can be designed as a flat plate; and if the rear cover of the mobile communication is a cambered cover, the bottom plate can be designed as a cambered plate.

Moreover, a groove 10 is formed in an inner surface of the bottom plate, and faces the accommodating space of the main body 1. The groove 10 is configured for receiving the vibrating acoustic driving module, and thus is designed to have a shape corresponding to the vibrating acoustic driving module. In particular, the groove 10 includes a first groove part 101 for receiving the main circuit board 2 and the amplifier 3, a second groove part 102 for receiving the vibrator 4, and a third groove part for receiving the FPC 5, the third groove part communicates with the first groove part and the second groove part, as illustrated in FIG. 1.

The main circuit board 2 may be a printed circuit board (PCB), and includes a socket 22 and a plurality of contacts 21; the contacts 21 are electrically connected to the socket 22. In the present embodiment, four contacts 21 are formed on the main circuit board 2, two of the contacts 21 serving as audio contacts and used for receiving audio signals from the mobile communication device; and the other two contacts 21 serving as power contacts, and used for receiving a power voltage from a power supply.

For example, when the mobile communication device is received in the protection case 100, the audio contacts and the power contacts of the main circuit board 2 can electrically contact an audio output and a battery of the mobile communication device respectively. As such, audio signals of the mobile communication device can be transmitted to the main circuit board 2 via the audio contacts 21, and the battery of the mobile communication device can provide the power voltage to the main circuit board 2 to enable the main circuit board 2, the amplifier 3 and the vibrator 4 to function.

Two ends of the FPC 5 (namely, a first end and a second end of the PFC 5) are electrically connected to the vibrator 4 and the main circuit board 2. In particular, the first end of the FPC 5 includes golden fingers formed thereon, and is plugged into the socket 22 of the main circuit board 2 so that the golden fingers of the FPC 5 can be electrically connected to the socket 22. The second end of the FPC 5 may be designed as a U-shaped connecting end 51, and the U-shape connecting end 51 is attached and electrically connected to the vibrator 4. Although the present embodiment employs the FPC 5 with the above-mentioned configuration, it should be noted that the FPC 5 may have other configuration or other connecting manner in an alternative embodiments.

The amplifier 3 is installed on the socket 22, and is electrically connected to the golden fingers of the FPC 5 through the socket 22. In the present embodiment, as shown in FIG. 2, the amplifier 3 includes a pair of audio signal output terminals A, a pair of audio signal input terminals B, and a pair of power terminals C. The audio signal output terminals A are electrically connected to the golden fingers of the FPC 5 through the socket 22, the audio signal input terminals B are electrically connected to the audio contacts 21 of the main circuit board 2, and the power terminals C are electrically connected to the power contacts 21 of the main circuit board 2. With this configuration, the amplifier 3 can obtain power from the mobile communication device via the power terminals C; moreover, the amplifier 3 can receive the audio signals from the mobile communication device via the audio signal input terminals B, perform power amplification on the audio signals, and output the amplified audio signals via the audio signal output terminals A; the amplified audio signals can further be transmitted to the vibrator 4 via the FPC 5.

Figure 4:
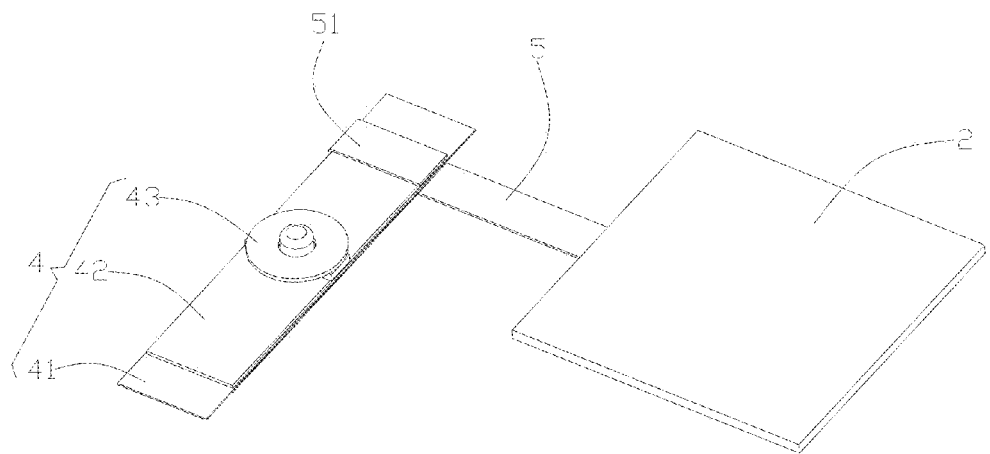
FIG. 4 is an assembled view of the main circuit board, the FPC and the vibrator of the protection case in FIG. 1.

Referring also to FIG. 4, the vibrator 4 may be a piezoelectric ceramic vibrator, and a vibrating direction of the vibrator 4 is perpendicular to the bottom plate of the main body 1. The vibrator 4 includes a base 41, a piezoelectric ceramic element 42 and an actuating unit 43. In the present embodiment, the base 41 may be a metal substrate, and the piezoelectric ceramic element 42 may be a piezoelectric ceramic plate attached on a surface of the base 41. Alternatively, the piezoelectric ceramic element 42 may include two piezoelectric ceramic plates respectively attached on two opposite surface of the base 41. The piezoelectric ceramic element 42 has a width substantially equal to that of the base 41, but has a length less than that of the base 41, such that two ends of the base 41 are exposed and not covered by the piezoelectric ceramic element 42 and can be fixed to the main body 1 of the protection case 100. The U-shape connecting end 51 of the FPC 5 is connected to the piezoelectric ceramic element 42, and thus the piezoelectric ceramic element 42 can be driven to vibrate by the amplified audio signals transmitted through the FPC 5.

The actuating unit 43 is fixed on the piezoelectric ceramic element 42, and in the present embodiment, an end of the actuating unit 43 further abuts on the main body 1, the actuating unit 43 is configured to transfer the vibrator of the piezoelectric ceramic element 42 to the main body 1, and thereby actuating the main body 1 to perform vibration and correspondingly produce audible sound. Alternatively, in other embodiments, an opening may be formed on the main body 1 of the protection case 100, and an end of the actuating unit 43 may extend through the opening of the main body 1 and further abut on an external vibration medium; with this configuration, the actuating unit 43 can actuate the external vibration medium to vibrate and produce audible sound correspondingly.

Figure 5:
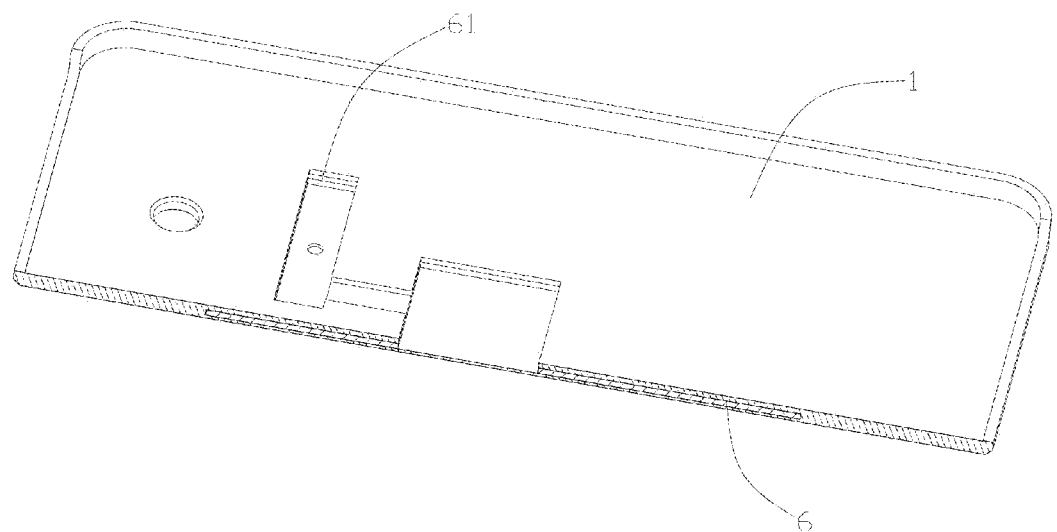
FIG. 5 is a cross-sectional view of a main body of the protection case in FIG. 1.

Referring to FIG. 1 and FIG. 5, the protection case 100 may optionally include a strength plate 60 and a protecting cover 7. The strength plate 60 can be a metal plate for improving an overall strength of the protection case 100, and is embedded within the bottom plate of the main body 1. The strength plate 60 includes a first opening 601 and a second opening 602 corresponding to the first groove part 101 and the second groove part 102 respectively. The first opening 601 and the second opening 602 are formed to prevent the strength plate 60 from blocking the main circuit board 2 and the vibrator 4 to receive in the groove 10.

In particular, a projection area of the second opening 602 on the bottom plate of the main body 1 is less than that of the second groove part 202, and thus a pair of steps 61 is respectively formed at two ends of the second groove part 202. When the vibrator 4 is received in the second groove part 202, the two ends of the base 41 can be soldered onto the steps respectively, so as to ensure the vibrator 4 to be stably fixed to the main body 1 of the protection case 100. Alternatively, if the strength plate 6 is not included in the protection case 100, the base 41 can be adhered onto the main body 1 by glue or being screwed onto the main body 1 by screws.

The protecting cover 7 is used for covering the groove 10 of the main body 1, so as to protect the main circuit board 2, the amplifier 3, the vibrator 4 and the FPC which are received in the groove 10. To enable the contacts 21 of the main circuit board 2 to electrically contact the mobile communication device, a plurality of through holes 70 are formed in the protecting cover 7. Each of the through holes 70 corresponds to a respective one of the contacts 21. The contacts 21 extend through the through holes 70 respectively, and are exposed on the protecting cover 7.

In summary, the vibrator 4, the amplifier 3 and the main circuit board 2 are integrated in the protection case 100 for the mobile communication device as provided in the present disclosure, with the configuration, the protection case 100 can not only protect the mobile communication device, but also provide functionality of audible sound generation. As such, the vibrator 4 and the amplifier 3 that might take up a large space are not needed to be disposed in the mobile communication device, which facilitates the miniaturization of the mobile communication device, and lower a manufacture cost of the mobile communication device.

In the above-described embodiment, the FPC 5 is adapted to realize interconnection between the main circuit board 2 and the vibrator 4, it should be noted, however, that the FPC 5 is an optional element which can be replaced by other elements or even omitted. For example, the FPC 5 may be replaced by connecting wires in an alternative embodiment. Furthermore, the power contacts 21 of the main circuit board 2 is configured to receive power from the battery of the mobile communication device, in an alternative embodiment, an independent battery can be adapted in the protection case 100 for providing power to the amplifier 3 and the vibrator 4.

Based on the protection case 100, the present disclosure can further provides a mobile communication assembly, which includes a mobile communication device such as a smart phone or a tablet personal computer, and a protection case as described in the above description; the mobile communication device is received in the protection case and is protected by the protection case, the protection case is capable of producing audible sound through vibration in accordance with audio signals output by the mobile communication device. Details of the protection case can be referred to the above description.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A protection case for a mobile communication device, comprising:
   a main body for receiving the mobile communication device;
   a main circuit board with an amplifier installed thereon; and
   a vibrator electrically connected to the amplifier;
   wherein the amplifier comprises audio signal input terminals for receiving audio signals from the mobile communication device, and audio signal output terminals for outputting the audio signals which are amplified by the amplifier to the vibrator; the vibrator is driven to vibrate in accordance with the audio signals output by the amplifier;

the vibrator is a piezoelectric ceramic vibrator, and a vibrating direction of the vibrator is perpendicular to the main body;

and the vibrator comprises a base, a piezoelectric ceramic element, and an actuating unit, the base is received and fixed in the main body, the piezoelectric ceramic element is attached on at least one surface of the base, and the actuating unit is disposed on the piezoelectric ceramic element.

2. The protection case for a mobile communication device of claim 1, wherein the actuating unit abuts on the main body, and is configured for actuating the main body to vibrate and correspondingly producing audible sound.

3. The protection case for a mobile communication device of claim 1, wherein the actuating unit abuts on a vibrating medium through an opening formed in the main body, and is configured for actuating the vibrating medium to vibrate and correspondingly producing audible sound.

4. The protection case for a mobile communication device of claim 1, the main circuit board comprises a socket, and the amplifier is installed on and electrically connected to the socket.

5. The protection case for a mobile communication device of claim 4, wherein the main circuit board further comprises a pair of audio contacts, the audio contacts are electrically connected to the audio signal input terminals of the amplifier, and electrically contact an audio output of the mobile communication device when the mobile communication device is received in the protection case.

6. The protection case for a mobile communication device of claim 5, wherein the main circuit board further comprises a pair of power contacts, the power contacts are configured to receive power from a battery of the mobile communication device when the mobile communication device is received in the protection case, or receive power from an independent battery inside the protection case.

7. The protection case for a mobile communication device of claim 6, further comprising a protecting cover covering the main circuit board and the vibrator.

8. The protection case for a mobile communication device of claim 7, wherein the protecting cover comprises a plurality of through holes corresponding to the audio contacts and the power contacts respectively, the audio contacts and the power contacts extend through the through holes and are exposed on the protecting cover.

9. The protection case for a mobile communication device of claim 4, further comprising a flexible printed circuit board (FPC), wherein the FPC is electrically connected between the main circuit board and the vibrator.

10. The protection case for a mobile communication device of claim 9, wherein the FPC comprises a first end having golden fingers formed thereon, and the first end of the FPC is plugged into the socket and the golden fingers are electrically connected to amplifier via the socket.

11. The protection case for a mobile communication device of claim 10, wherein the FPC further comprises a second end configured as a U-shaped connecting end, the U-shaped connecting end is attached and electrically connected to the vibrator.

12. The protection case for a mobile communication device of claim 1, the main body comprises a bottom plate and a plurality of sidewalls, the sidewalls extend perpendicularly from the bottom plate and cooperate with the bottom plate to form an accommodating space for receiving the mobile communication device.

13. The protection case for a mobile communication device of claim 12, wherein a groove is formed in the bottom plate; the groove comprises a first groove part for receiving the main circuit board and the amplifier, and a second groove part for receiving the vibrator.

14. The protection case for a mobile communication device of claim 13, wherein the groove further comprises a third groove part that communicates with the first groove part and the second groove part.

15. The protection case for a mobile communication device of claim 13, further comprising a strength plate embedded within the bottom plate of the main body, wherein the strength plate comprises a first opening and a second opening corresponding to the first groove part and the second groove part respectively.

16. The protection case for a mobile communication device of claim 15, wherein a projection area of the second opening on the bottom plate is less than that of the second groove part, so as to form a pair of steps at two ends of the second groove part respectively.

17. The protection case for a mobile communication device of claim 16, wherein the strength plate is a metal plate, and two ends of the vibrator are respectively soldered onto the steps respectively.

18. A protection case for a mobile communication device, comprising:
    a main body for receiving the mobile communication device;
    a main circuit board with an amplifier installed thereon; and a vibrator electrically connected to the amplifier;
    wherein the amplifier comprises audio signal input terminals for receiving audio signals from the mobile communication device, and audio signal output terminals for outputting the audio signals which are amplified by the amplifier to the vibrator; the vibrator is driven to vibrate in accordance with the audio signals output by the amplifier;
    and the main circuit board comprises a socket, and the amplifier is installed on and electrically connected to the socket.

19. A protection case for a mobile communication device, comprising:
    a main body for receiving the mobile communication device;
    a main circuit board with an amplifier installed thereon; and
    a vibrator electrically connected to the amplifier;
    wherein the amplifier comprises audio signal input terminals for receiving audio signals from the mobile communication device, and audio signal output terminals for outputting the audio signals which are amplified by the amplifier to the vibrator; the vibrator is driven to vibrate in accordance with the audio signals output by the amplifier;
    and the main body comprises a bottom plate and a plurality of sidewalls, the sidewalls extend perpendicularly from the bottom plate and cooperate with the bottom plate to form an accommodating space for receiving the mobile communication device.

* * * * *